(12) United States Patent
Jindal et al.

(10) Patent No.: US 12,561,850 B2
(45) Date of Patent: Feb. 24, 2026

(54) IMAGE GENERATION WITH LEGIBLE SCENE TEXT

(71) Applicant: ADOBE INC., San Jose, CA (US)

(72) Inventors: Nipun Jindal, Delhi (IN); Brent Getlin, Wayzata, MN (US); Oliver Brdiczka, San Jose, CA (US)

(73) Assignee: ADOBE INC., San Jose, CA (US)

( * ) Notice: Subject to any disclaimer, the term of this patent is extended or adjusted under 35 U.S.C. 154(b) by 212 days.

(21) Appl. No.: 18/449,286

(22) Filed: Aug. 14, 2023

(65) Prior Publication Data

US 2025/0061610 A1    Feb. 20, 2025

(51) Int. Cl.
| | |
|---|---|
| *G06T 11/60* | (2006.01) |
| *G06F 40/103* | (2020.01) |
| *G06F 40/126* | (2020.01) |
| *G06T 3/4053* | (2024.01) |
| *G06T 11/00* | (2006.01) |
| *G06V 30/10* | (2022.01) |

(52) U.S. Cl.
CPC ............ *G06T 11/00* (2013.01); *G06F 40/103* (2020.01); *G06F 40/126* (2020.01); *G06T 3/4053* (2013.01); *G06T 11/60* (2013.01); *G06V 30/10* (2022.01)

(58) Field of Classification Search
None
See application file for complete search history.

(56) References Cited

U.S. PATENT DOCUMENTS

| | | | | |
|---|---|---|---|---|
| 9,684,986 B1 * | 6/2017 | C | ............................ | G06V 10/46 |
| 2021/0365836 A1 * | 11/2021 | Wilkins | ............. | G02B 27/0018 |
| 2022/0189190 A1 * | 6/2022 | Arroyo | ................. | G06V 20/62 |
| 2023/0377214 A1 * | 11/2023 | Kansy | .................... | G06V 10/82 |
| 2024/0062569 A1 * | 2/2024 | Mittal | .................... | G06V 10/82 |
| 2024/0119743 A1 * | 4/2024 | Xue | ................. | G06V 30/19093 |

OTHER PUBLICATIONS

1Liu, et al., "Character-Aware Models Improve Visual Text Rendering", arXiv preprint arXiv:2212.10562v2 [cs.CL] May 3, 2023, 26 pages.
2"ByT5." https://huggingface.co/docs/transformers/model_doc/byt5, 2023, 7 pages.
3Nichol, et al., "Improved Denoising Diffusion Probabilistic Models", arXiv preprint arXiv:2102.09672v1 [cs.LG] Feb. 18, 2021, 17 pages.

* cited by examiner

*Primary Examiner* — Joni Hsu
(74) *Attorney, Agent, or Firm* — F. CHAU & ASSOCIATES, LLC

(57) ABSTRACT

Systems and methods for generating images with legible scene text are described. Embodiments are configured to obtain a prompt describing a scene, where the prompt includes scene text indicating text that is intended to be shown in a generated image; encode, using a prompt encoder, the prompt to generate a prompt embedding; encode, using a character-level encoder, the scene text to generate a character-level embedding; and generate, using an image generation network, an image that includes the scene text based on the prompt embedding and the character-level embedding.

17 Claims, 13 Drawing Sheets

Obtain a prompt describing a scene, where the prompt includes scene text

905

Encode the prompt to generate a prompt embedding

910

Encode the scene text to generate a character-level embedding

915

Generate an image that includes the scene text based on the prompt embedding and the character-level embedding

920

Training images with legible scene text

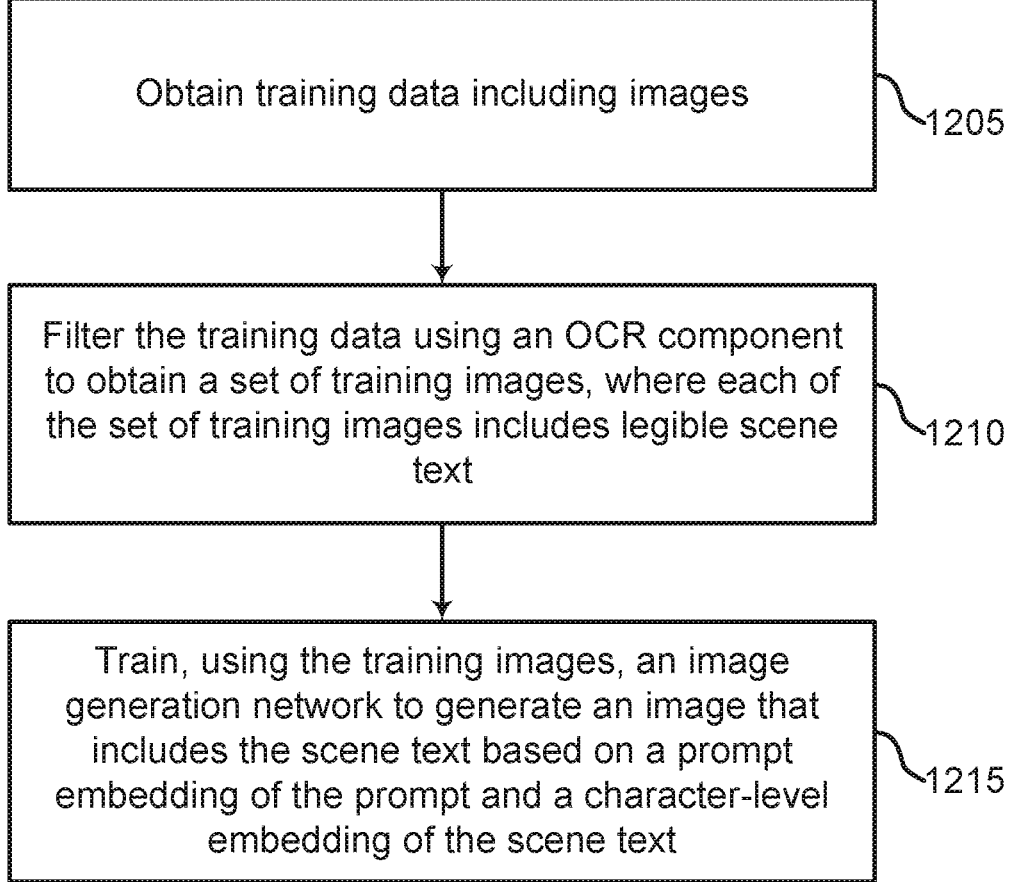

Obtain training data including images
1205

Filter the training data using an OCR component to obtain a set of training images, where each of the set of training images includes legible scene text
1210

Train, using the training images, an image generation network to generate an image that includes the scene text based on a prompt embedding of the prompt and a character-level embedding of the scene text
1215

FIG. 12

IMAGE GENERATION WITH LEGIBLE SCENE TEXT

BACKGROUND

The following relates generally to generative machine learning models, and more specifically to image generation. Generative AI, a subfield of artificial intelligence, has been increasingly integrated into creative workflows, providing a transformative impact on industries ranging from digital art and design to entertainment and advertising. Generative AI enables the synthesis of high-quality, original content. The technology utilizes deep learning models, such as Generative Adversarial Networks (GANs) and diffusion models, to learn from vast amounts of data and generate new content that mimics the input data in style and structure.

One use for generative AI is to create images based on an input prompt. This task is often referred to as a "text to image" task or simply "text2img". Some models such as GANs and Variational Autoencoders (VAEs) employ an encoder-decoder architecture with attention mechanisms to align various parts of text with image features. With the advent of transformer models in NLP, further advances were made by incorporating these architectures to better model relationships between text prompts and generated images. Newer approaches such as denoising diffusion probabilistic models (DDPMs) iteratively refine generated images in response to textual prompts. Recent research into DDPMs has yielded techniques that increase semantic alignment between generated images and provided text, thereby enhancing the efficacy of visual content generation.

SUMMARY

Systems and methods for generating images with legible scene text are described. As used herein "scene text" refers to text that is intended to be shown in a generated image. Embodiments of the present disclosure include an image generation apparatus that includes a character-level encoder. Embodiments identify and extract scene text from a text prompt, and encode the scene text using the character-level encoder to generate a character-level embedding. The character-level embedding is combined with an embedding of the text prompt to create a conditioning embedding. An image generation network of the image generation apparatus is configured to generate an image based on the conditioning embedding, where the generated image includes the scene text.

A method, apparatus, non-transitory computer readable medium, and system for image generation are described. One or more aspects of the method, apparatus, non-transitory computer readable medium, and system include obtaining a prompt describing a scene, wherein the prompt includes scene text; encoding, using a prompt encoder, the prompt to generate a prompt embedding; encoding, using a character-level encoder, the scene text to generate a character-level embedding; and generating, using an image generation network, an image that includes the scene text based on the prompt embedding and the character-level embedding.

A method, apparatus, non-transitory computer readable medium, and system for image generation are described. One or more aspects of the method, apparatus, non-transitory computer readable medium, and system include obtaining training data including a prompt describing a scene, wherein the prompt includes scene text and training, using the training data, an image generation network to generate an image that includes the scene text based on a prompt embedding of the prompt and a character-level embedding of the scene text.

An apparatus, system, and method for image generation are described. One or more aspects of the apparatus, system, and method include at least one processor; at least one memory including instructions executable by the processor; and an image generation network comprising parameters stored in the at least one memory, wherein the image generation network is trained to generate an image that includes scene text based on a prompt embedding of a prompt that includes the scene text and based on a character-level embedding of the scene text.

BRIEF DESCRIPTION OF THE DRAWINGS

FIG. 12 shows an example of a method for training generative machine learning models according to aspects of the present disclosure.

DETAILED DESCRIPTION

Figure 1:
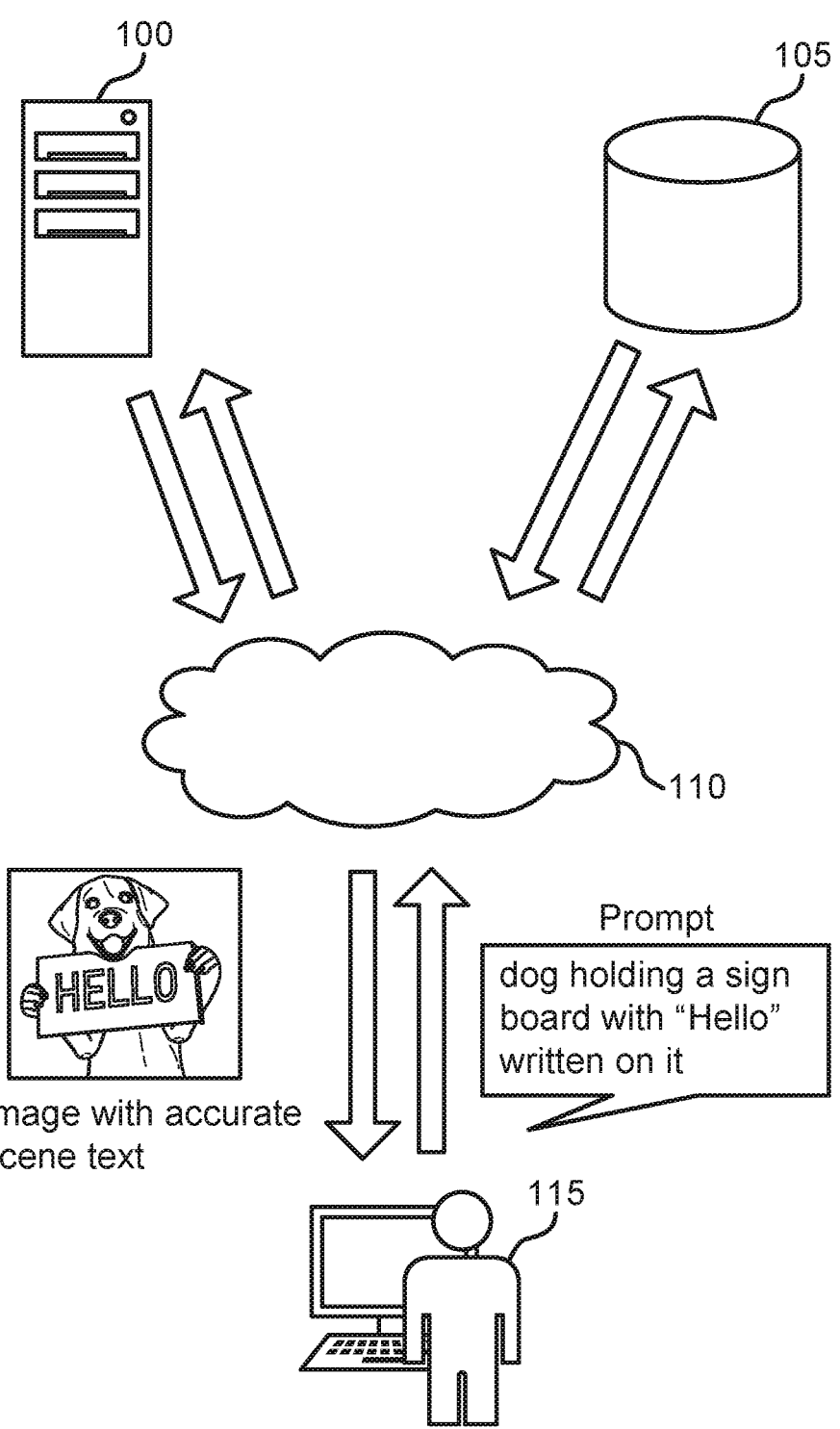
FIG. 1 shows an example of an image generation system according to aspects of the present disclosure.

Generative AI has transformed creative workflows. Users are able to generate high-quality images by conveying their ideas in a text prompt to generative models. For example, in an ideation phase, a creator begins by conceptualizing a distinct scene or object they wish to visualize. This might be a fantastical creature, a surreal landscape, or a complex object that would be challenging to draw or model by hand. The creator then condenses this idea into a concise, descriptive text prompt, carefully choosing language to capture the salient features of the envisioned scene or object. The prompt might describe colors, shapes, spatial relationships, mood, or any other aspects of the concept that the creator deems important.

In some cases, a creator may wish to generate an image that includes text within the image itself, also referred to as "scene text". However, conventional models often fail to create images with legible scene text. The generated images may include letters that are misshaped or garbled, or words that are misspelled. One reason for these inaccuracies is that the prompt encoders of conventional models utilize byte-pair encoding (BPE).

BPE is a type of sub-word tokenization that can prevent an out-of-vocabulary issue and allows a model to infer the meaning of unknown or rare words by breaking them down into known sub-words. BPE methods begin with a base vocabulary of individual characters, and iteratively merge the most frequently adjacent pair of symbols to form new, longer symbols.

In the context of text-to-image generative models, text prompts are typically encoded into a vector representation that the model can understand. BPE is conventionally used in this encoding step to effectively handle the variety of words or phrases that might appear in the prompts. It allows the model to understand not just individual words, but also common parts of words, which can be crucial in understanding nuanced meanings or rare terms that might come up in the creative process. For example, if the prompt includes the word "cybernetic," even if the model hasn't seen this word during training, if it has learned the sub-words "cyber" and "netic," it can potentially understand the meaning.

However, as BPE strives to achieve smaller and smaller vocabulary sizes, the meaning of individual characters becomes obfuscated or lost. This can cause scene text in the generated image to be illegible, as the model has not fully captured the representations of the letters of the scene text. In contrast, a character-level encoder encodes the meaning of individual characters, which enables the accurate recreation of text characters. In some cases, encoding an entire text prompt using a character-level encoder entails encoding into a very large dimension, which can result in a larger model that uses increased compute power with slower inference times.

Embodiments of the present disclosure utilize both a character-level encoder and a prompt encoder. Embodiments extract scene text from a text prompt and encode the scene text at the character level, and combine this character-level encoding with the prompt encoding to condition image generation. In this way, embodiments improve upon image processing with generative models by enabling the generation of images with legible scene text, while maintaining reduced compute power and model size.

An image generation system configured to generate images with legible scene text is described with reference to FIGS. 1-4. Techniques and methods for image generation are described with reference to FIGS. 5-9. Training methods are described with reference to FIGS. 10-12. A computing device configured to implement an image generation apparatus is described with reference to FIG. 13.

Image Generation System

An apparatus for image generation is described. One or more aspects of the apparatus include at least one processor; at least one memory including instructions executable by the processor; and an image generation network comprising parameters stored in the at least one memory, wherein the image generation network is trained to generate an image that includes scene text based on a prompt embedding of a prompt that includes the scene text and based on a character-level embedding of the scene text. In some aspects, the image generation network comprises a diffusion model.

Some examples of the apparatus, system, and method further include a prompt encoder configured to encode the prompt to generate the prompt embedding. Some examples further include a character-level encoder configured to encode the scene text to generate the character-level embedding.

Some examples of the apparatus, system, and method further include a text decomposer configured to extract the scene text from the prompt. Some examples further include an OCR component configured to extract text from training images. Some examples of the apparatus, system, and method further include a super-resolution network configured to enhance the resolution of a base image.

FIG. 1 shows an example of an image generation system according to aspects of the present disclosure. The example shown includes image generation apparatus 100, database 105, cloud 110, and user 115. Image generation apparatus 100 is an example of, or includes aspects of, the corresponding element described with reference to FIG. 2.

In an example process, user 115 provides a prompt to the system via a user interface of a user device. The prompt may be a text prompt that includes scene text, such as "dog holding a sign board with 'Hello' written on it", where 'Hello' is the scene text. The prompt is input to image generation apparatus 100 over cloud 110. Image generation apparatus 100 extracts the scene text and encodes the scene text using a character-level encoder, and encodes the prompt using a prompt encoder. Both encodings are combined to form a conditioning embedding, which image generation apparatus 100 uses to generate an image. In some aspects, the generation is performed by an image generation network that includes parameters stored on database 105. Image generation network is an example of, or includes aspects of, the corresponding element described with reference to FIG. 2.

In some embodiments, one or more components of image generation apparatus 100 are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

According to some aspects, image generation apparatus 100 obtains a prompt describing a scene, where the prompt includes scene text. In some examples, image generation apparatus 100 provides the prompt embedding and the character-level embedding as a conditioning input to the image generation network.

Database 105 is configured to store information used by image generation apparatus 100, such as parameters of machine learning models. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, a database controller may operate automatically without user interaction.

Cloud 110 facilitates the transfer of information between image generation apparatus 100, database 105, and user 115. Cloud 110 is a computer network configured to provide on-demand availability of computer system resources, such as data storage and computing power. In some examples, cloud 110 provides resources without active management by user 115. The term cloud is sometimes used to describe data centers available to many users over the Internet. Some large cloud networks have functions distributed over multiple locations from central servers. A server is designated an edge server if it has a direct or close connection to user 115. In some cases, cloud 110 is limited to a single organization. In other examples, the cloud 110 is available to many organizations. In one example, cloud 110 includes a multi-layer communications network comprising multiple edge routers and core routers. In another example, a cloud 110 is based on a local collection of switches in a single physical location.

Figure 2:
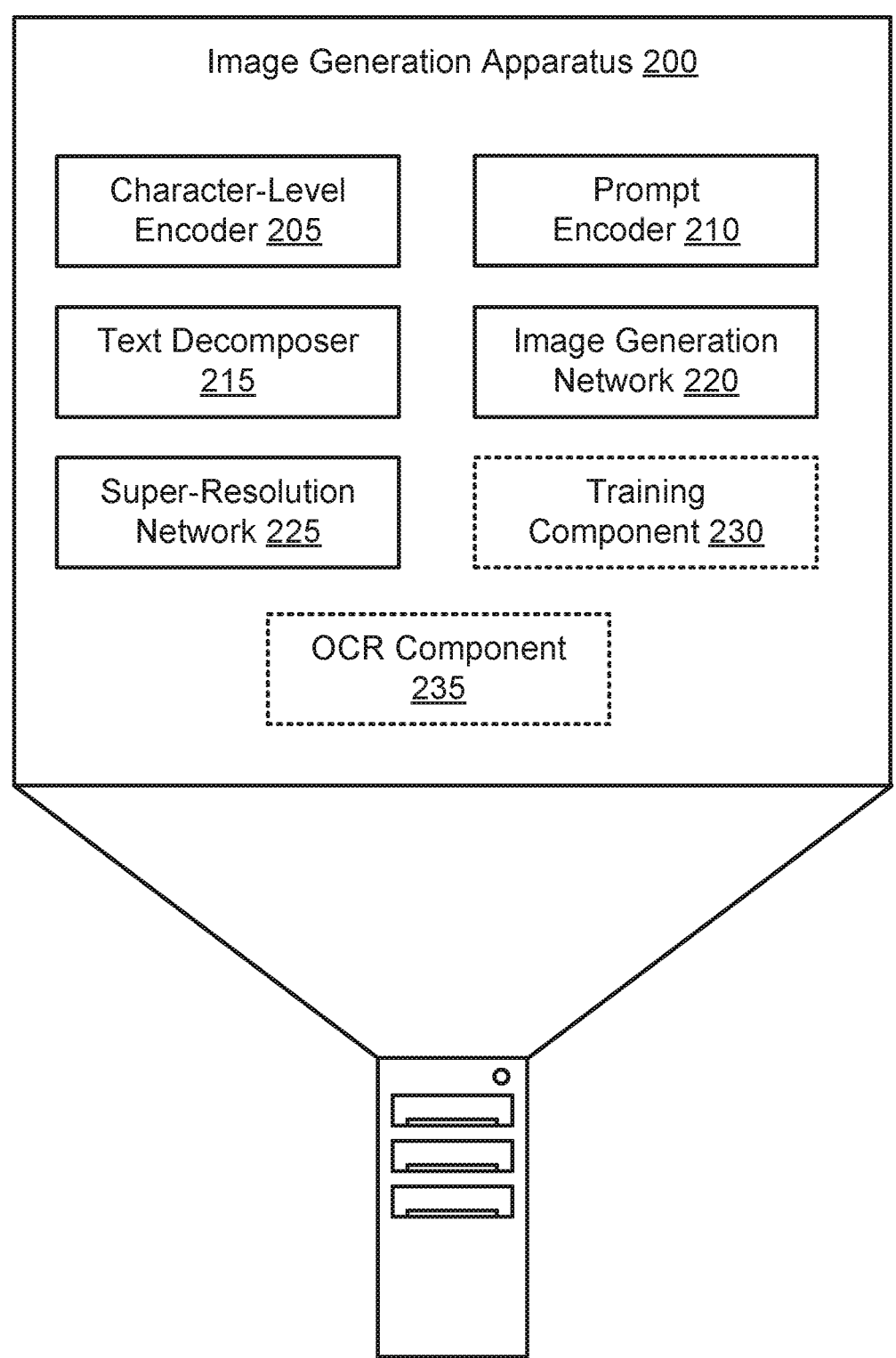
FIG. 2 shows an example of an image generation apparatus according to aspects of the present disclosure.

FIG. 2 shows an example of an image generation apparatus 200 according to aspects of the present disclosure. The example shown includes image generation apparatus 200, character-level encoder 205, prompt encoder 210, text decomposer 215, image generation network 220, super-resolution network 225, training component 230, and OCR component 235.

Embodiments of image generation apparatus 200 include several components and sub-components. These components are variously named, and are described so as to partition the functionality enabled by the processor(s) and the executable instructions included in the computing device used to implement image generation apparatus 200 (such as the computing device described with reference to FIG. 13). The partitions may be implemented physically, such as through the use of separate circuits or processors for each component, or may be implemented logically via the architecture of the code executable by the processors.

One or more components of image generation apparatus 200 include an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Character-level encoder 205 is configured to encode text into a vector, e.g., a list of scalar values, which is sometimes referred to as an embedding. A character-level encoder represents individual characters, as opposed to encoding multi-character tokens. In some embodiments, character-level encoder 205 is based on a ByT5 model. ByT5 is a model that includes an architecture that operates on text characters directly, such as UTF-8 characters, in contrast to models that process learned token vocabularies. According to some aspects, character-level encoder includes a transformer architecture.

A transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

According to some aspects, character-level encoder 205 encodes scene text to generate a character-level embedding. In some examples, character-level encoder 205 generates an additional character-level embedding based on the additional scene text, where the image is generated based on the additional character-level embedding. Character-level encoder 205 is an example of, or includes aspects of, the corresponding element described with reference to FIG. 3.

Prompt encoder 210 is configured to encode text to generate a prompt embedding. In some embodiments, prompt encoder 210 includes a tokenizer that uses byte-level encoding, which learns a vocabulary of tokens to represent meaning in a text. According to some aspects, prompt encoder 210 does not encode at the character level. In some embodiments, the prompt embedding produced by prompt encoder 210 has a lower dimensionality than the character level embedding produced by character-level encoder 205. Some embodiments of prompt encoder 210 include a multimodal encoder, which is capable of encoding text data and image data into a same embedding space.

Text decomposer 215 is configured to extract scene text from a text prompt. Scene text is text that is intended to be shown in a generated image. Embodiments of text decomposer 215 include a transformer-based model such as a Generative Pre-trained Transformer (GPT). According to some aspects, the text(s) extracted from text decomposer 215 are input to character-level encoder 205 to generate a character-level embedding.

According to some aspects, text decomposer 215 extracts the scene text from an input prompt. In some examples, text decomposer 215 identifies a typographic property of the scene text based on the prompt, where the character-level embedding is based on the typographic property. Examples of typographic properties include the start and end of a string, padding information, and font information. In some examples, text decomposer 215 identifies a position of the scene text based on the prompt, where the character-level embedding is based on the position. For example, text decomposer 215 may determine that a portion of the scene text is intended to be placed on one line, and another portion of the scene text is intended to be placed on a different line. Text decomposer 215 is an example of, or includes aspects of, the corresponding element described with reference to FIGS. 3 and 4.

Image generation network 220 is configured to generate image data. Embodiments of image generation network 220 include a generative model such as a denoising diffusion probabilistic model (DDPM). Additional detail regarding image generation network 220 will be provided with reference to FIG. 5.

Super-resolution network 225 is configured to upsample an input image to produce an output image with higher resolution and greater detail. In some cases, an image generated from image generation network 220 is upsampled by super-resolution network 225 before being presented to the user as a final generated image. Super-resolution network 225 is an example of, or includes aspects of, the corresponding element described with reference to FIG. 3.

Embodiments of super-resolution network 225 include a Generative Adversarial Network (GAN). A GAN is an ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution).

Therefore, given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning.

Training component 230 is configured to compute loss functions and update parameters of image generation apparatus 200 based on the loss functions. In some embodiments, training component 230 updates parameters of character-level encoder 205, prompt encoder 210, text decomposer 215, image generation network 220, super-resolution network 225, OCR component 235, or a combination thereof. In at least one embodiment, training component 230 is implemented on an apparatus other than image generation apparatus 200.

According to some aspects, training component 230 trains, using training data, an image generation network 220 to generate an image that includes the scene text based on a prompt embedding of the prompt and a character-level embedding of the scene text. In some examples, training component 230 computes a loss function based on the scene text and predicted scene text found in the generated image by OCR component 235, where the image generation network 220 is trained based on the loss function. In some examples, training component 230 filters a set of images based on character recognition from OCR component 235 to obtain a set of training images, where the image generation network 220 is trained based on the set of training images. In some examples, training component 230 identifies a text area for a training image in the set of training images. In some examples, training component 230 crops the training image based on the text area. For example, training component 230 may crop a training image to generate additional variations of a training image while ensuring the text area remains in the image.

OCR component 235 is configured to extract text from images. In some embodiments, OCR component 235 is used during a training process to determine a predicted scene text (e.g., the placement and legibility of characters, the spelling of words, etc.), where the predicted scene text is input to training component 230 for evaluation. Embodiments of OCR component 235 utilize template matching methods, rule-based feature extraction methods, ANN feature extraction methods, transformer-based models, or a combination thereof for identifying characters in images. OCR component 235 is an example of, or includes aspects of, the corresponding element described with reference to FIG. 11.

Figure 3:
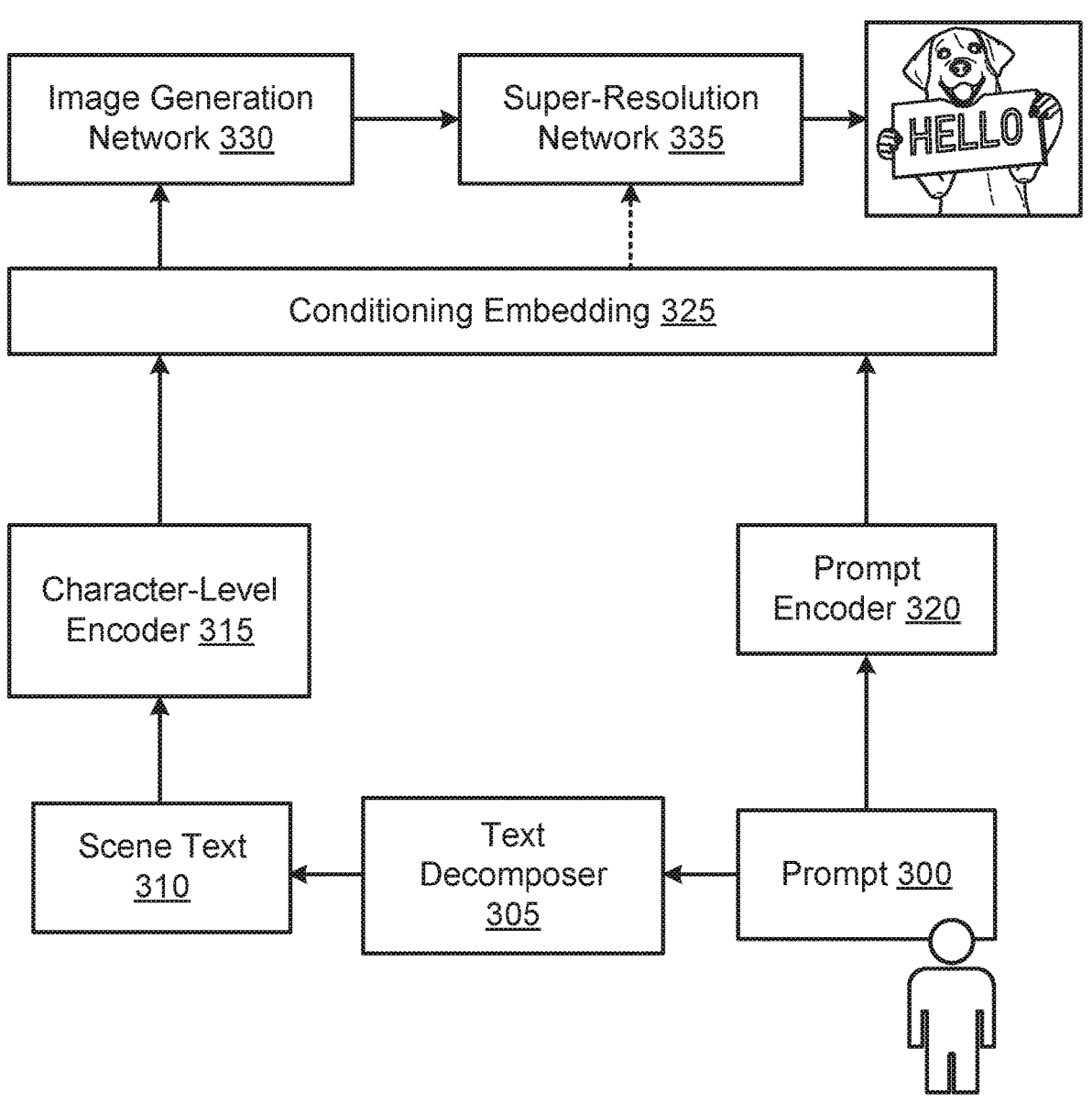
FIG. 3 shows an example schematic overview of an image generation pipeline according to aspects of the present disclosure.

FIG. 3 shows an example schematic overview of an image generation pipeline according to aspects of the present disclosure. The example shown includes prompt 300, text decomposer 305, scene text 310, character-level encoder 315, prompt encoder 320, conditioning embedding 325, image generation network 330, and super-resolution network 335. The components shown are examples of, or includes aspects of, the corresponding elements described with reference to FIG. 2.

In this example, a user inputs prompt 300 to the system. The prompt 300 is input to prompt encoder 320 to generate a prompt embedding. Some examples of prompt encoder 320 include a multimodal encoder such as CLIP. Contrastive Language-Image Pre-Training (CLIP) is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

Another copy of the prompt 300 is input to text decomposer 305 to extract scene text therefrom. Embodiments of text decomposer 305 include a transformer-based large language model (LLM) such as GPT, GPT-3, GPT-4, or others. In some cases, text decomposer 305 executes a directive prompt that includes prompt 300 to extract the scene text. An example of the directive prompt may be:

"Extract all the text that will go on the image with this text prompt. Write each text in a different line:", followed by prompt 300. The output of the LLM model is then parsed by text decomposer 305 to extract scene text 310.

Scene text 310 is then input to character-level encoder 315 to generate a character-level embedding. Some embodiments of character-level encoder 315 are based on a pre-trained encoder such as ByT5. Some embodiments are based on an un-trained encoder, which is trained during a training phase to learn to generate embeddings that result in generated images that are well-aligned with a text prompt and include legible scene text. An example of a process for training the un-trained encoder to learn to generate embeddings is described with reference to FIGS. 11-12.

According to some aspects, in contrast to tokenizing a text input into multi-character tokens, character-level encoder 315 processes each character individually as a token. For example, some embodiments of character-level encoder 315 encode UTF-8 characters that represent characters in 8-bits. In some embodiments, character-level encoder 315 is further configured to process non-character tokens such as tokens that represent the start and end of a string, an unknown token, a padding token, and the start and end of a text object. In some cases, these tokens are represented by, respectively, [<s>, </s>, <unk>, <pad>, <obj>, </obj>]. By capturing this extra information in the character-level embedding, the resultant generated images are more accurate to the prompt: e.g., the texts will be placed on different lines or in different areas accordingly.

According to some aspects, character-level encoder 315 includes an encoder with a max input length. The input length may be adjusted, e.g., as a hyperparameter. In one embodiment, character-level encoder 315 includes a length of 128, and the size of each embedding is 1024, such that the text conditioning has a dimension of 128×1024. When an input scene text is fewer than 128 bits, then a <pad> token may be appended. Embodiments are not limited thereto, however, and the dimensions may be adjusted as hyperparameters according to the use case of the model.

The character-level embedding and the prompt embedding are combined into a same embedding space as conditioning embedding 325. In some aspects, the combination includes adding the character-level embedding to the prompt embedding. For example, the character-level embedding may be added to the prompt embedding such that their values are each embedded into separate areas of the shared embedding space, but the present disclosure is not necessarily limited thereto. For example, the two embeddings may be combined using another transform or operation.

An illustrative example of a prompt is: "boy holding a guitar with "Kapy" written on it and a neon background text "Happy Times Ahead"". An extraction of the scene text from this prompt may produce:

<s><obj>Kapy</obj><obj>Happy Times Ahead</obj></s><pad><pad>

Encoding this scene text may produce a list of numbers corresponding to an encoding of each character, such as a UTF-8 encoding: [257, 259, 75, 97, 112, 121, 260, 259, 72, 97, 112, 112, 121, 32, 84, 105, 109, 101, 115, 32, 65, 104, 101, 97, 100, 260, 258 . . . ]. This list of numbers representing the characters may be processed by character-level encoder 315 to produce the character-level embedding described above. In some embodiments, conditioning embedding 325, which includes the character-level embedding and the prompt embedding, is applied to image generation network 330 at some iterations of a generative diffusion process, and is not applied at other iterations.

In some embodiments, after an image including legible scene text has been generated by image generation network 330, a super-resolution network 335 processes the generated image to produce a final high-resolution image with a resolution that is greater than a resolution of the generated image. According to some aspects, the conditioning embedding 325 is also applied to super-resolution network 335 during the upscaling process.

Figure 4:
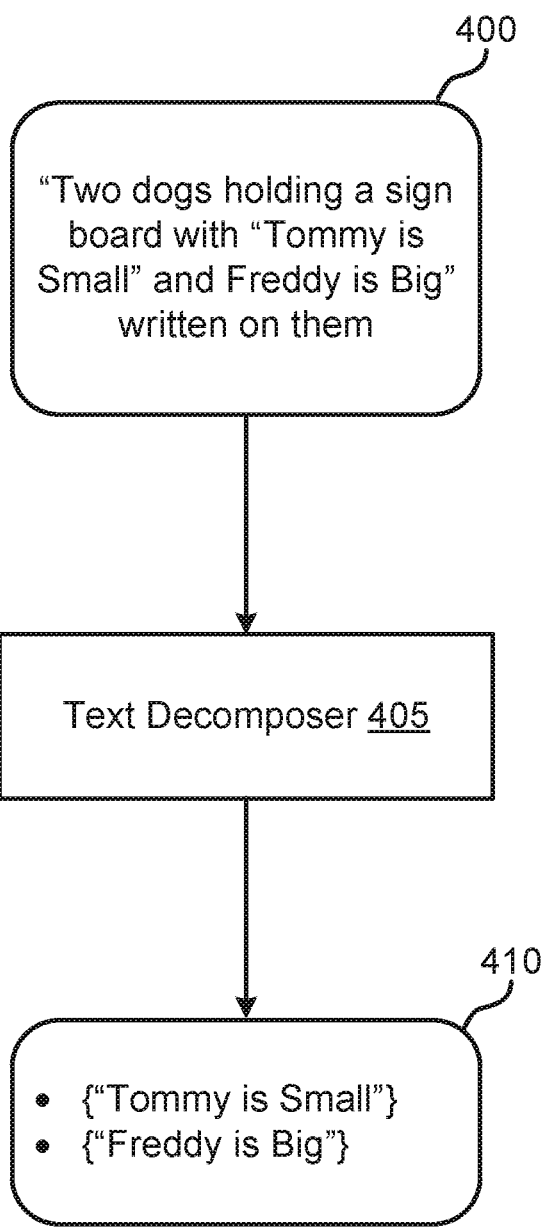
FIG. 4 shows an example of a pipeline for extracting scene text according to aspects of the present disclosure.

FIG. 4 shows an example of a pipeline for extracting scene text according to aspects of the present disclosure. The example shown includes prompt 400, text decomposer 405, and scene text including individual text objects 410.

In the example shown, prompt 400 is input to text decomposer 405. Embodiments of text decomposer 405 include a transformer-based large language model (LLM) such as GPT, GPT-3, GPT-4, or others. In some cases, text decomposer 405 executes a directive prompt that includes prompt 400 to extract the scene text. An example of the directive prompt may be: "Extract all the text that will go on the image with this text prompt. Write each text in a different line:", followed by prompt 400. The output of the LLM model is then parsed by text decomposer 405 to extract scene text including individual text objects 410.

Image Generation

A method for image generation is described. One or more aspects of the method include obtaining a prompt describing a scene, wherein the prompt includes scene text; encoding, using a prompt encoder, the prompt to generate a prompt embedding; encoding, using a character-level encoder, the scene text to generate a character-level embedding; and generating, using an image generation network, an image that includes the scene text based on the prompt embedding and the character-level embedding.

Some examples of the method, apparatus, non-transitory computer readable medium, and system further include extracting the scene text from the prompt using a text decomposer. Some examples further include providing the prompt embedding and the character-level embedding as a conditioning input to the image generation network.

Some examples of the method, apparatus, non-transitory computer readable medium, and system further include generating a base image using the image generation network. Some examples further include enhancing the resolution of the base image using a super-resolution network based on the prompt embedding and the character-level embedding to obtain the image.

Some examples of the method, apparatus, non-transitory computer readable medium, and system further include obtaining a noise image. Some examples further include performing an iterative reverse diffusion process on the noise image using the image generation network to obtain the image. In at least some examples, the conditioning input is provided at predetermined steps of the iterative reverse diffusion process. For example, the reverse diffusion process may include a first phase and a second phase. In some cases, the conditioning input is provided during the second phase and not during the first phase.

Some examples of the method, apparatus, non-transitory computer readable medium, and system further include identifying a typographic property of the scene text based on the prompt, wherein the character-level embedding is based on the typographic property. Some examples further include identifying a position of the scene text based on the prompt, wherein the character-level embedding is based on the position.

Some examples of the method, apparatus, non-transitory computer readable medium, and system further include identifying an additional scene text. Some examples further include generating an additional character-level embedding based on the additional scene text, wherein the image is generated based on the additional character-level embedding. For example, the additional scene text may be another text object that is extracted from the prompt. A text object is a set of text that may include multiple lines and is intended to be placed in a same region based on the prompt. For example, a prompt describing a scene text including text to be displayed on a handheld sign and text to be displayed on a neon billboard may include two text objects.

Figure 5:
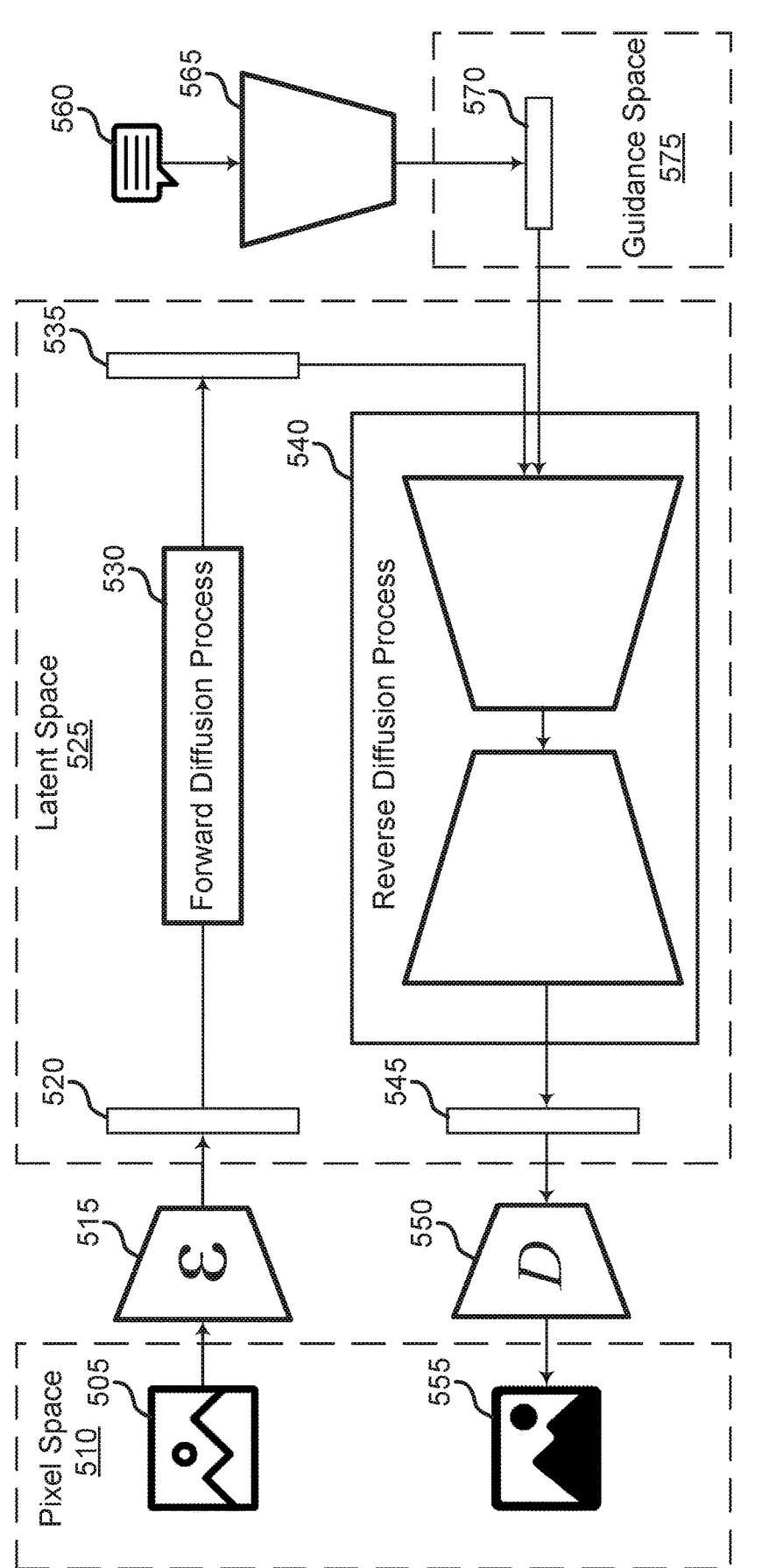
FIG. 5 shows an example of an image generation network according to aspects of the present disclosure.

Embodiments are configured to generate images using an image generation network. FIG. 5 shows an example of an image generation network with a DDPM architecture according to aspects of the present disclosure. The guided latent diffusion model 500 depicted in FIG. 2 is an example of, or includes aspects of, the image generation network described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 500 may take an original image 505 in a pixel space 510 as input and apply and image encoder 515 to convert original image 505 into original image features 520 in a latent space 525. Then, a forward diffusion process 530 gradually adds noise to the original image features 520 to obtain noisy features 535 (also in latent space 525) at various noise levels.

Next, a reverse diffusion process 540 (e.g., a U-Net ANN) gradually removes the noise from the noisy features 535 at the various noise levels to obtain denoised image features 545 in latent space 525. In some examples, the denoised image features 545 are compared to the original image features 520 at each of the various noise levels, and parameters of the reverse diffusion process 540 of the diffusion model are updated based on the comparison. Finally, an image decoder 550 decodes the denoised image features 545 to obtain an output image 555 in pixel space 510. In some cases, an output image 555 is created at each of the various noise levels. The output image 555 can be compared to the original image 505 to train the reverse diffusion process 540.

In some cases, image encoder 515 and image decoder 550 are pre-trained prior to training the reverse diffusion process 540. In some examples, they are trained jointly, or the image encoder 515 and image decoder 550 and fine-tuned jointly with the reverse diffusion process 540.

The reverse diffusion process 540 can also be guided based on a text prompt 560, or another guidance prompt, such as an image, a layout, a segmentation map, a mask as described with reference to FIG. 3, a default embedding in absence of a text prompt, etc. The text prompt 560 can be encoded using a text encoder 565 (e.g., a multimodal encoder) to obtain guidance features 570 in guidance space 575. In some cases, text prompt 560 corresponds to the conditioning embedding described above with reference to FIG. 3, where the conditioning embedding includes a character-level embedding and a prompt embedding.

According to some aspects, an image generation network generates guidance features 570 by incorporating information from an input image. The guidance features 570 can be combined with the noisy features 535 at one or more layers of the reverse diffusion process 540 to ensure that the output image 555 includes content described by the text prompt 560. For example, guidance features 570 can be combined with the noisy features 535 using a cross-attention block within the reverse diffusion process 540.

Figure 6:
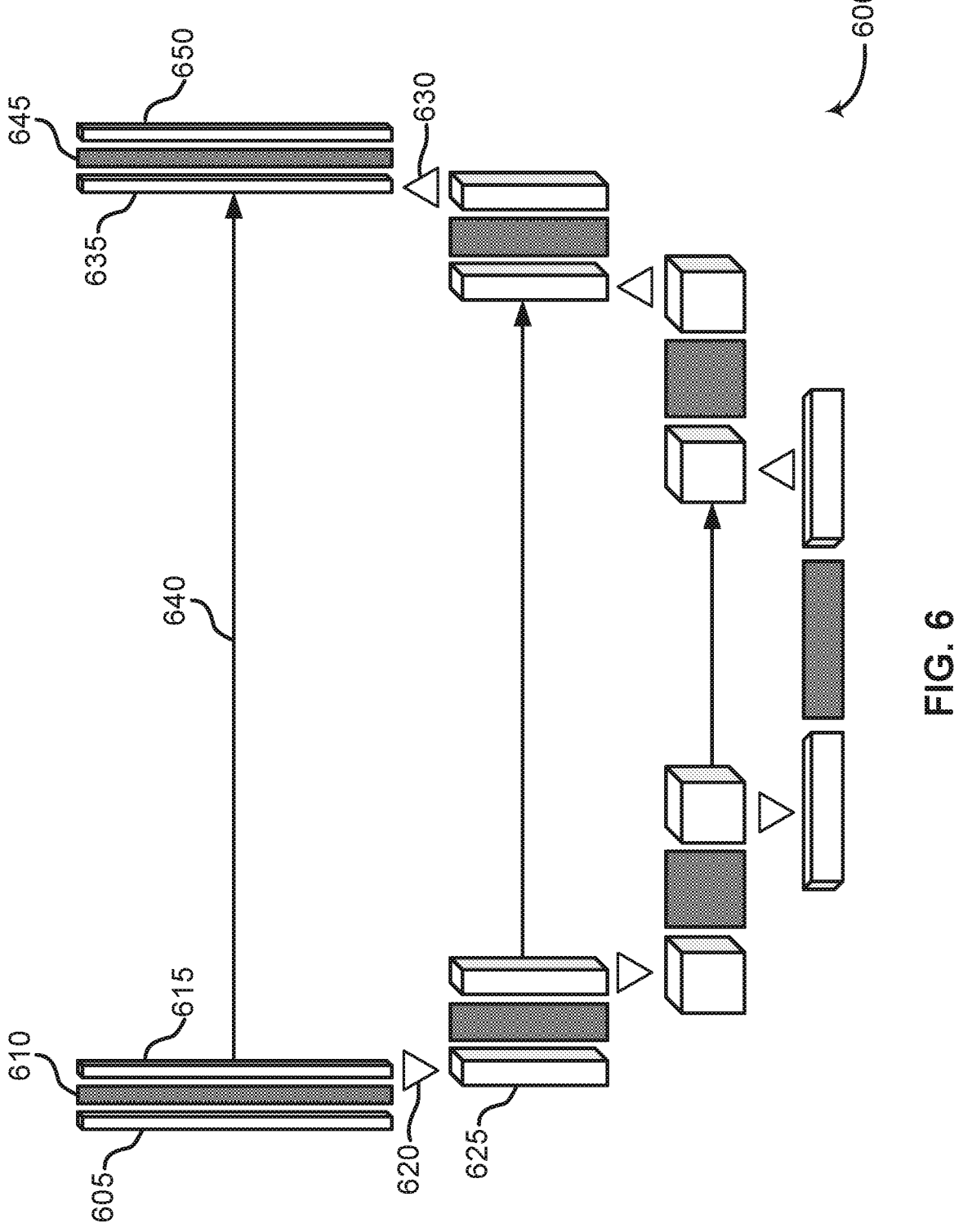
FIG. 6 shows an example of a U-Net according to aspects of the present disclosure.

FIG. 6 shows an example of a U-Net 600 according to aspects of the present disclosure. The U-Net 600 depicted in FIG. 6 is an example of, or includes aspects of, the architecture used within the reverse diffusion process described with reference to FIG. 5.

In some examples, diffusion models are based on a neural network architecture known as a U-Net. The U-Net 600 takes input features 605 having an initial resolution and an initial number of channels, and processes the input features 605 using an initial neural network layer 610 (e.g., a convolutional network layer) to produce intermediate features 615. The intermediate features 615 are then down-sampled using a down-sampling layer 620 such that down-sampled features 625 have a resolution less than the initial resolution and a number of channels greater than the initial number of channels.

This process is repeated multiple times, and then the process is reversed. That is, the down-sampled features 625 are up-sampled using up-sampling process 630 to obtain up-sampled features 635. The up-sampled features 635 can be combined with intermediate features 615 having a same resolution and number of channels via a skip connection 640. These inputs are processed using a final neural network layer 645 to produce output features 650. In some cases, the output features 650 have the same resolution as the initial resolution and the same number of channels as the initial number of channels.

In some cases, U-Net 600 takes additional input features to produce conditionally generated output. For example, the additional input features could include a vector representation of an input prompt. The additional input features can be combined with the intermediate features 615 within the neural network at one or more layers. For example, a cross-attention module can be used to combine the additional input features and the intermediate features 615.

Figure 7:
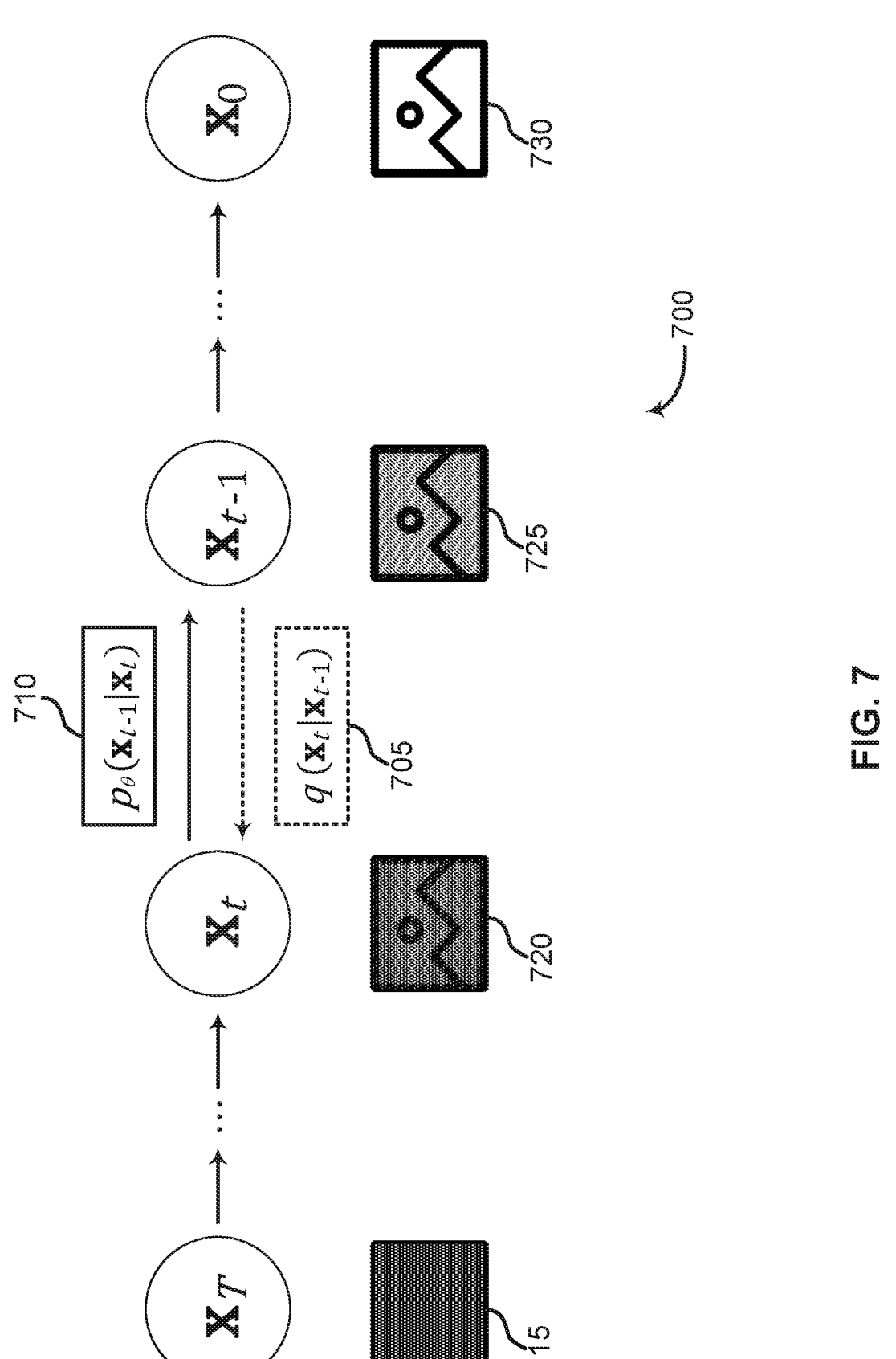
FIG. 7 shows an example of a diffusion process according to aspects of the present disclosure.

FIG. 7 shows a diffusion process 700 according to aspects of the present disclosure. As described above with reference to FIG. 5, a diffusion model can include both a forward diffusion process 705 for adding noise to an image (or features in a latent space) and a reverse diffusion process 710 for denoising the images (or features) to obtain a denoised image. The forward diffusion process 705 can be represented as $q(x_t|x_{t-1})$, and the reverse diffusion process 710 can be represented as $p(x_{t-1}|x_t)$. In some cases, the forward diffusion process 705 is used during training to generate images with successively greater noise, and a neural network is trained to perform the reverse diffusion process 710 (i.e., to successively remove the noise).

In an example forward process for a latent diffusion model, the model maps an observed variable $x_0$ (either in a pixel space or a latent space) intermediate variables $x_1, \ldots$, $x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 710, the model begins with noisy data $x_T$, such as a noisy image 715 and denoises the data to obtain the $p(x_{t-1}|x_t)$. At each step t−1, the reverse diffusion process 710 takes $x_t$, such as first intermediate image 720, and t as input. Here, t represents a step in the sequence of transitions associated with different noise levels, The reverse diffusion process 710 outputs $x_{t-1}$, such as second intermediate image 725 iteratively until $x_T$ is reverted back to $x_0$, the original image 730. The reverse process can be represented as:

$$p_\theta(x_{t-1} \mid x_t) := N\left(x_{t-1}; \mu_\theta(x_t, t), \sum\nolimits_\theta (x_t, t)\right). \quad (1)$$

The joint probability of a sequence of samples in the Markov chain can be written as a product of conditionals and the marginal probability:

$$x_T: p_\theta(x_{0:T}) := p(x_T) \prod\nolimits_{t=1}^{T} p_\theta(x_{t-1} \mid x_t), \quad (2)$$

where $p(x_T)=N(x_T; 0,I)$ is the pure noise distribution as the reverse process takes the outcome of the forward process, a sample of pure noise, as input and $\Pi_{t=1}^{T} p_\theta$ $(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 8:
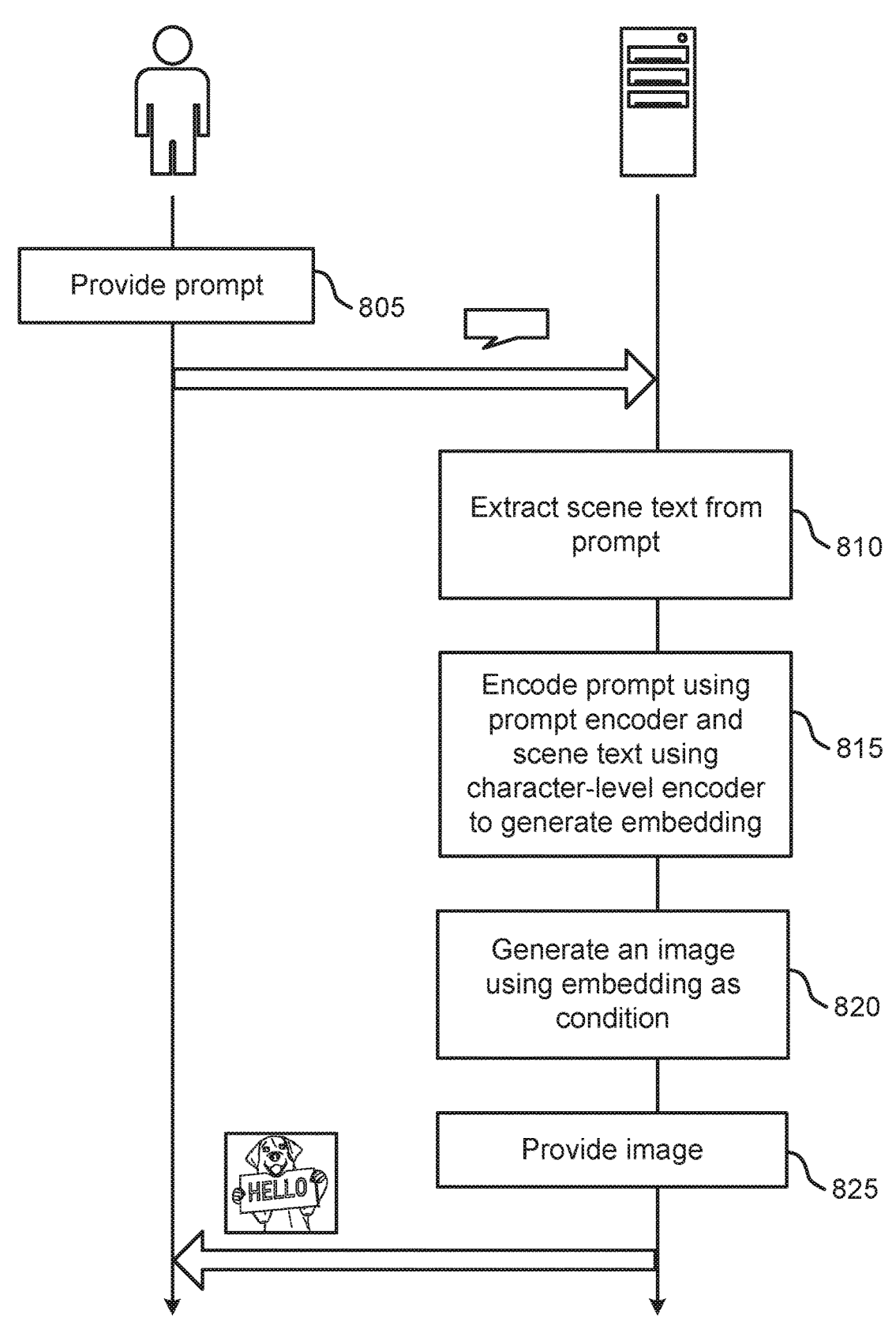
FIG. 8 shows an example of a method for providing an image with legible text to a user according to aspects of the present disclosure.

FIG. 8 shows an example of a method for providing an image with legible text to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the a user provides a prompt. The prompt may be a text based prompt that includes scene text such as "dog holding a sign board with 'Hello' written on it", where "Hello" is the scene text.

At operation 810, the system extracts the scene text from the prompt. The system may extract the scene text using a text decomposer as described with reference to FIG. 4.

At operation 815, the system encodes the prompt using a prompt encoder and encodes the scene text using character-level encoder to generate a conditioning embedding. According to some aspects, the prompt embedding and the character-level embedding of the scene text are combined to form the conditioning embedding.

At operation 820, the system generates an image using the conditioning embedding as a condition for the generation process. The generation may be performed by an image generation network as described with reference to FIGS. 2 and 5. In some examples, the conditioning embedding is applied to predetermined iterations of an iterative generation process. In some embodiments, the system further upsamples the image to increase its resolution using a super-resolution network. In at least one embodiment, the system applies the conditioning embedding to the super-resolution network during the upsampling process.

At operation 825, the system provides the image to the user. The system may provide the image via a user interface, such as a graphical user interface (GUI) of a web-app or client application.

Figure 9:
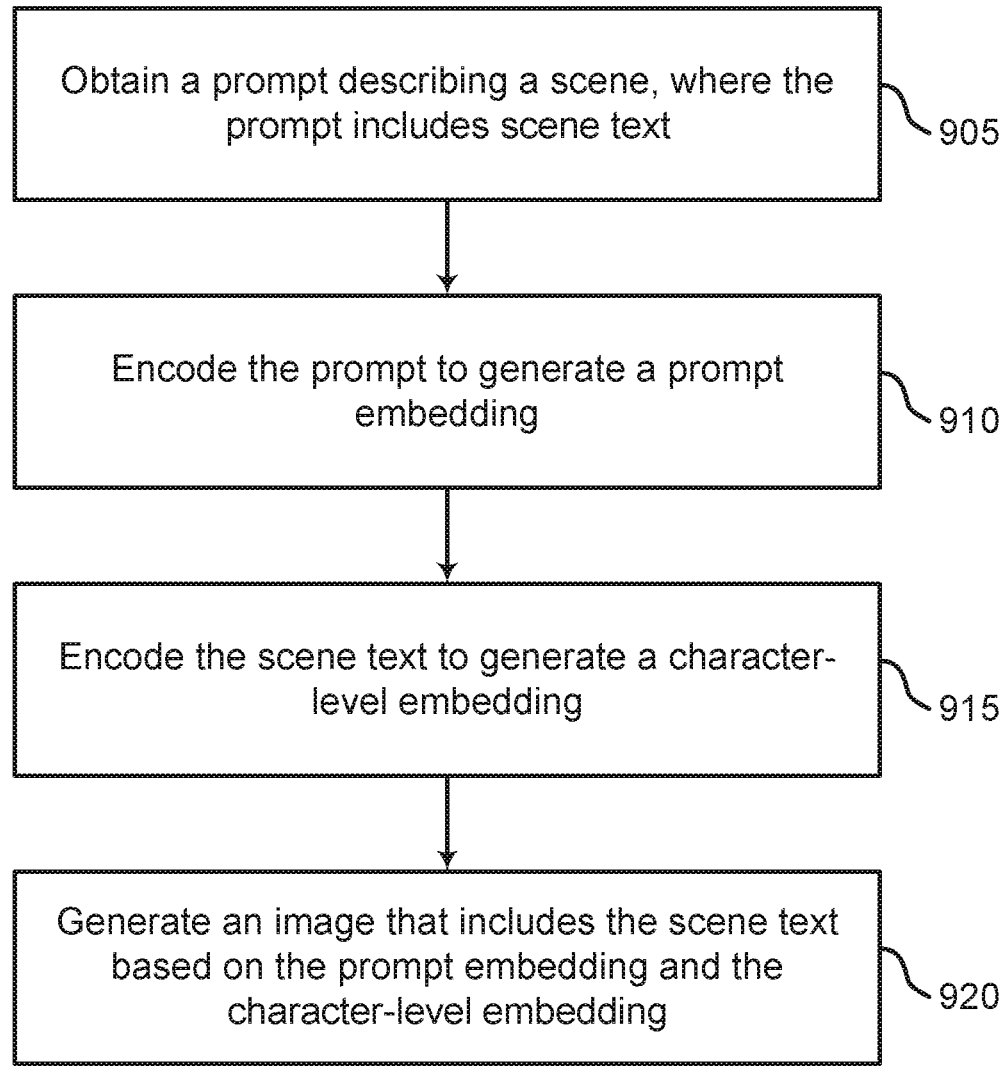
FIG. 9 shows an example of a method for generating an image with legible text according to aspects of the present disclosure.

FIG. 9 shows an example of a method for generating an image with legible text according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains a prompt describing a scene, where the prompt includes scene text. In some cases, the operations of this step refer to, or may be performed by, an image generation apparatus as described with reference to FIGS. 1 and 2. For example, the system may display a prompt text field to a user via a GUI, and the user may input the prompt via the text prompt text field.

At operation 910, the system encodes the prompt to generate a prompt embedding. In some cases, the operations of this step refer to, or may be performed by, a prompt encoder as described with reference to FIGS. 2 and 3. Embodiments of the prompt encoder include a multimodal encoder, such as CLIP. In some embodiments, the prompt encoder includes architecture configured to perform byte-pair encoding (BPE), though the present disclosure is not necessarily limited thereto.

At operation 915, the system encodes the scene text to generate a character-level embedding. In some cases, the operations of this step refer to, or may be performed by, a character-level encoder as described with reference to FIGS. 2 and 3. Embodiments of the character-level encoder include a pre-trained encoder such as ByT5. Some embodiments of the character-level encoder may be initially untrained and are then trained during a training phase.

At operation 920, the system generates an image that includes the scene text based on the prompt embedding and the character-level embedding. In some cases, the operations of this step refer to, or may be performed by, an image generation network as described with reference to FIGS. 2-3 and 5. For example, the system may combine the prompt embedding and the character-level embedding to form a conditioning embedding, and the image generation network may generate the image via an iterative diffusion process that is conditioned by the conditioning embedding.

Training

A method for image generation is described. One or more aspects of the method include obtaining training data including a prompt describing a scene, wherein the prompt includes scene text and training, using the training data, an image generation network to generate an image that includes the scene text based on a prompt embedding of the prompt and a character-level embedding of the scene text.

Some examples of the method, apparatus, non-transitory computer readable medium, and system further include encoding, using a prompt encoder, the prompt to generate the prompt embedding. Some examples further include encoding, using a character-level encoder, the scene text to generate the character-level embedding.

Some examples of the method, apparatus, non-transitory computer readable medium, and system further include generating a training output using the image generation network. Some examples further include performing character recognition on the training output to obtain predicted scene text. According to some aspects, an OCR component as described with reference to FIG. 2 performs OCR on the training output to obtain the predicted scene text. Some examples further include computing a loss function based on the scene text and the predicted scene text, wherein the image generation network is trained based on the loss function. For example, training data may include images that have legibly depicted scene text, along with a text label of the scene text. A training component may compare the ground-truth scene text from the label to the predicted scene text from the generated training output, and compute the loss function based on the comparison.

Some examples of the method, apparatus, non-transitory computer readable medium, and system further include obtaining a set of images. Some examples further include performing character recognition on the set of images. Some examples further include filtering the set of images based on the character recognition to obtain a set of training images, wherein the image generation network is trained based on the set of training images. Additional detail regarding this process will be provided with reference to FIG. 11.

Some examples of the method, apparatus, non-transitory computer readable medium, and system further include identifying a text area for a training image in the set of training images. Some examples further include cropping the training image based on the text area. For example, the OCR component may determine a bounding box of the identified text. A training component may be additionally configured to transform training images by various transformations such as cropping, rotating, scaling, applying additional coloring, etc., to generate additional training images. The bounding box information may be supplied to the training component to ensure that the legible text is not removed or distorted.

Figure 10:
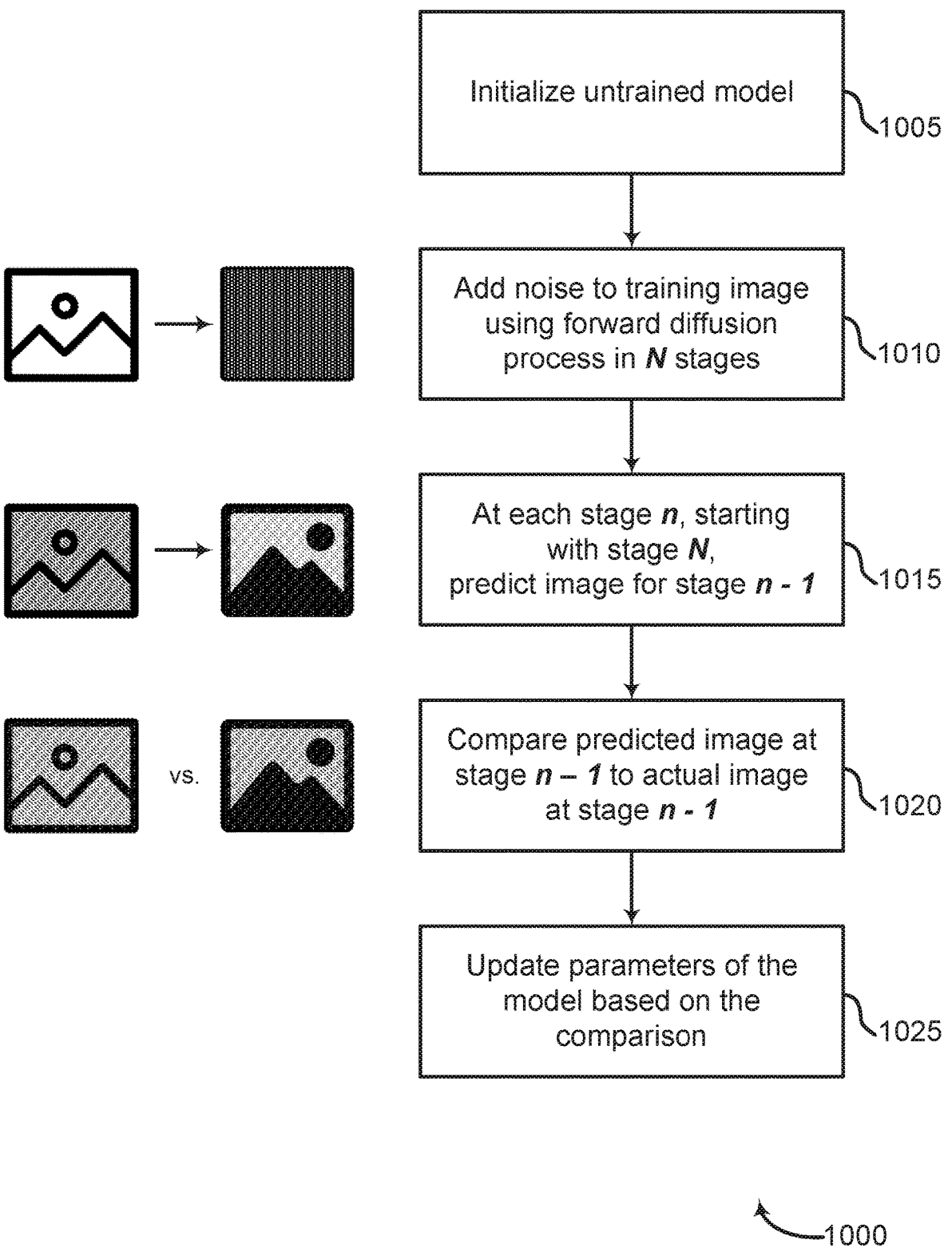
FIG. 10 shows an example of a method for training a diffusion model according to aspects of the present disclosure.

FIG. 10 shows an example of a method 1000 for training a diffusion model according to aspects of the present disclosure. The method 1000 represents an example for training a reverse diffusion process as described above with reference to FIG. 5. In some examples, these operations are performed by a system including a processor executing a set of codes to control functional elements of an apparatus, such as the apparatus described in FIG. 2. The set of codes configured to perform the training process may be, or be part to, a training component as described with reference to FIG. 2.

Additionally or alternatively, certain processes of method 1000 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1010, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1015, the system at each stage n, starting with stage N, a reverse diffusion process is used to predict the image or image features at stage n–1. For example, the reverse diffusion process can predict the noise that was added by the forward diffusion process, and the predicted noise can be removed from the image to obtain the predicted image. In some cases, an original image is predicted at each stage of the training process.

At operation 1020, the system compares predicted image (or image features) at stage n–1 to an actual image (or image features), such as the image at stage n–1 or the original input image. For example, given observed data x, the diffusion model may be trained to minimize the variational upper bound of the negative log-likelihood $-\log p_\theta(x)$ of the training data.

At operation 1025, the system updates parameters of the model based on the comparison. For example, parameters of a U-Net may be updated using gradient descent. Time-dependent parameters of the Gaussian transitions can also be learned.

Figure 11:
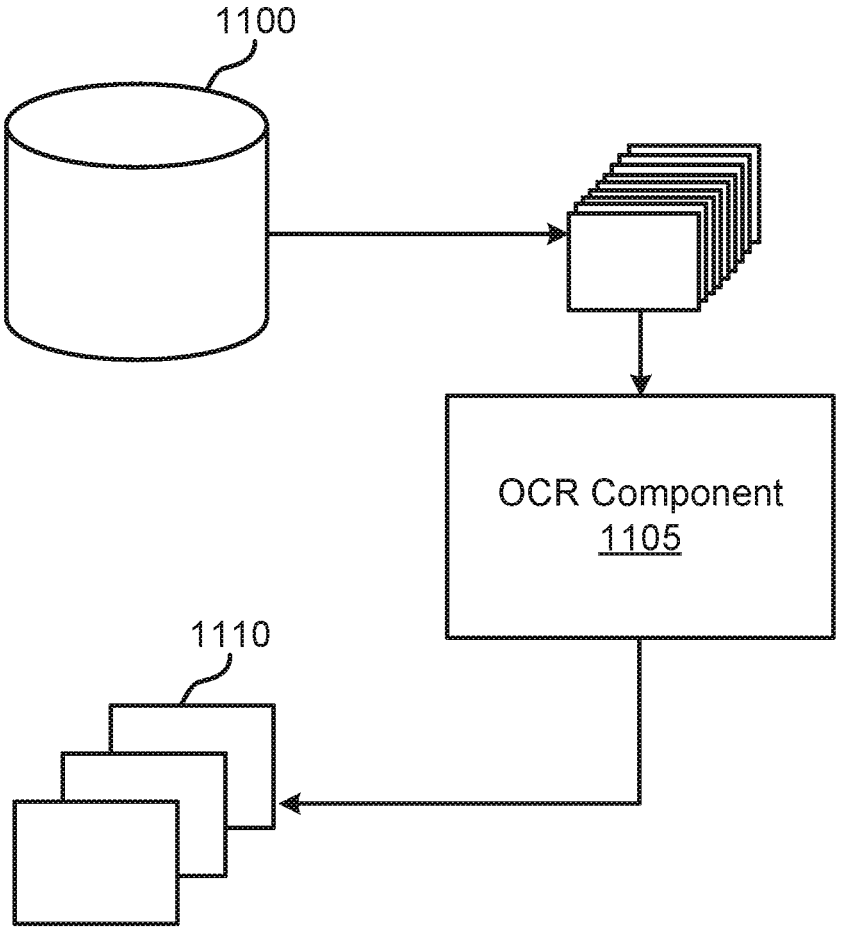
FIG. 11 shows an example of a pipeline for generating training data including legible text according to aspects of the present disclosure.

FIG. 11 shows an example of a pipeline for generating training data including legible text according to aspects of the present disclosure. A training dataset may include a large number of images, while only a subset of the images includes scene text. The pipeline described with reference to FIG. 11 includes a process for extracting the images with scene text. The example shown includes database 1100, OCR component 1105, and training images 1110. Database 1100 is an example of, or includes aspects of, the corresponding element described with reference to FIG. 1. OCR component 1105 is an example of, or includes aspects of, the corresponding element described with reference to FIG. 2.

In this example, database 1100 stores a large training dataset of images. The training dataset is processed by OCR component 1105 to produce training images 1110. For example, OCR component 1105 may determine if an image from the training dataset contains scene text. Then, OCR component 1105 may extract the scene text from the image, and produce the image with the scene text as a ground-truth label as a training image. In some embodiments, OCR component 1105 further ensures that the scene text is legible by, for example, checking for spelling or legibility errors using a trained network. Embodiments of OCR component 1105 utilize template matching methods, rule-based feature extraction methods, ANN feature extraction methods, transformer-based models, or a combination thereof for identifying characters in images.

FIG. 12 shows an example of a method for training generative machine learning models according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system obtains training data including images. In some cases, the operations of this step refer to, or may be performed by, an image generation apparatus as described with reference to FIGS. 1 and 2. The training data may be stored on a database, and may be part of a large dataset such as ImageNet or the like.

At operation 1210, the system filters the training data using an OCR component to obtain a set of training images, where each of the set of training images includes legible scene text. In some cases, the operations of this step refer to, or may be performed by, an OCR component as described with reference to FIG. 2. The system may filter the training data according to the process described with reference to FIG. 11.

At operation 1215, the system trains, using the training images, an image generation network to generate an image that includes the scene text based on a prompt embedding of the prompt and a character-level embedding of the scene text. For example, a training component such as the one described with reference to FIG. 2, may compute a loss function based on a comparison of predicted scene text produced by the image generation network (as identified by an OCR component) with ground-truth scene text from the training images. This loss function may be used to update parameters of the system, such as parameters of the image generation network, a super-resolution network, a prompt encoder, a character-level encoder, or a combination thereof. The loss function may be used to perform, for example, gradient descent to update parameters of the system.

Figure 13:
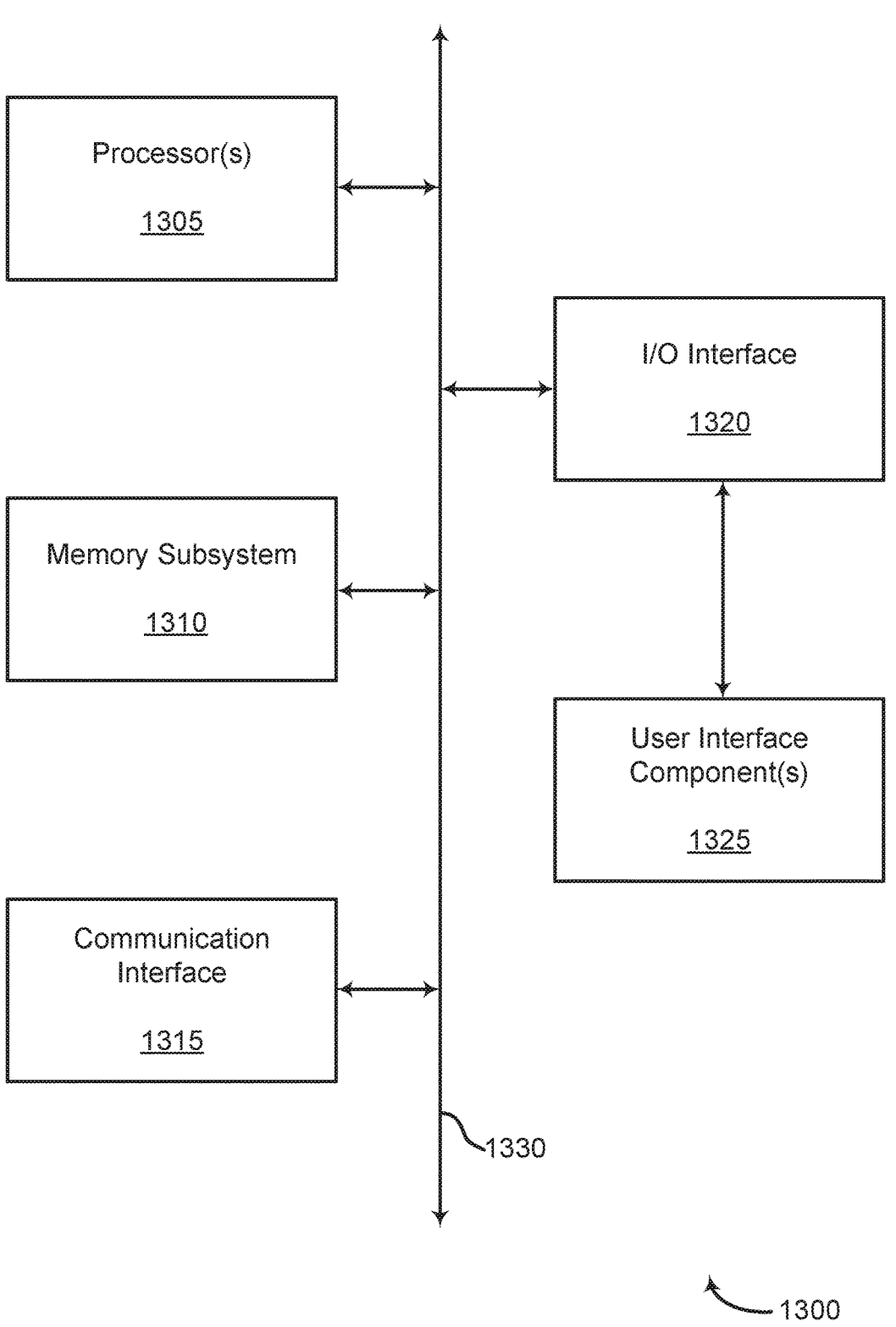
FIG. 13 shows an example of a computing device according to aspects of the present disclosure.

FIG. 13 shows an example of a computing device 1300 according to aspects of the present disclosure. The example shown includes computing device 1300, processor(s) 1305, memory subsystem 1310, communication interface 1315, I/O interface 1320, user interface component(s), and channel 1330.

In some embodiments, computing device 1300 is an example of, or includes aspects of, image generation apparatus 100 of FIG. 1. In some embodiments, computing device 1300 includes one or more processors 1305 are configured to execute instructions stored in memory subsystem 1310 to obtain a prompt describing a scene, wherein the prompt includes scene text; encode, using a prompt encoder, the prompt to generate a prompt embedding; encode, using a character-level encoder, the scene text to generate a character-level embedding; and generate, using an image generation network, an image that includes the scene text based on the prompt embedding and the character-level embedding.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, micro-controller, or state machine. A processor may also be implemented as a combination of computing devices (e.g., a combination of a DSP and a microprocessor, multiple micro-processors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infra-red, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
    obtaining a prompt describing a scene, wherein the prompt includes scene text and a scene element;
    extracting scene text from the prompt using a text decom-poser;
    encoding, using a prompt encoder, the prompt to generate a prompt embedding representing the scene element;

encoding, using a character-level encoder, the scene text to generate a character-level embedding representing the scene text; and
    generating, using an image generation network, an image based on the prompt embedding and the character-level embedding, wherein the image depicts the scene including the scene text and the scene element.

2. The method of claim 1, wherein extracting the scene text comprises:
    prompting the text decomposer to identify the scene text in the prompt; and
    wrapping the identified scene text in one or more non-character tokens to obtain a formatted scene text; and
    encoding the formatted scene text using the character-level encoder.

3. The method of claim 2, wherein extracting the scene text further comprises identifying a typographic property of the scene text based on the prompt, wherein the character-level embedding is based on the typographic property.

4. The method of claim 2, wherein extracting the scene text further comprises identifying a position of the scene text based on the prompt, wherein the character-level embedding is based on the position.

5. The method of claim 2, wherein extracting the scene text further comprises identifying an additional scene text, and wherein the method further comprises generating an additional character-level embedding based on the additional scene text, wherein the image is generated based on the additional character-level embedding.

6. The method of claim 1, wherein the generation further comprises:
    providing the prompt embedding and the character-level embedding as a conditioning input to the image gen-eration network.

7. The method of claim 1, wherein the generation further comprises generating a base image using the image genera-tion network and enhancing a resolution of the base image using a super-resolution network based on the prompt embedding and the character-level embedding to obtain the image.

8. The method of claim 1, wherein the generation further comprises:
    obtaining a noise image; and
    performing an iterative reverse diffusion process on the noise image using the image generation network to obtain the image.

9. A method comprising:
    obtaining training data including a prompt describing a scene, wherein the prompt includes scene text and a scene element;
    extracting scene text from the prompt using a text decom-poser;
    training, using the training data, an image generation network to generate an image that includes the scene text based on a prompt embedding of the prompt and a character-level embedding of the scene text, wherein the image depicts the scene including the scene text and the scene element;
    encoding, using a prompt encoder, the prompt to generate the prompt embedding representing the scene element; and
    encoding, using a character-level encoder, the scene text to generate the character-level embedding representing the scene text.

10. The method of claim 9, wherein the training further comprises generating a training output using the image generation network, performing character recognition on the training output to obtain predicted scene text, and computing a loss function based on the scene text and the predicted scene text, wherein the image generation network is trained based on the loss function.

11. The method of claim 9, wherein obtaining the training data further comprises:

obtaining a set of images, performing character recognition on the set of images, and filtering the set of images based on the character recognition to obtain a set of training images, wherein the image generation network is trained based on the set of training images.

12. The method of claim 11, further comprising:

identifying a text area for a training image in the set of training images; and cropping the training image based on the text area.

13. An apparatus comprising:

at least one processor;

at least one memory including instructions executable by the processor; and the apparatus further comprising:

a text decomposer comprising parameters stored in the at least one memory and configured to extract scene text from a prompt, wherein the prompt describes a scene and includes scene text and a scene element;

an image generation network comprising parameters stored in the at least one memory, wherein the image generation network is trained to generate an image based on a prompt embedding of the prompt and a character-level embedding of the scene text, wherein the image depicts the scene including the scene text and the scene element;

a prompt encoder configured to encode the prompt to generate the prompt embedding representing the scene element; and a character-level encoder configured to encode the scene text to generate the character-level embedding.

14. The apparatus of claim 13, wherein the text decomposer is further configured to:

wrap the identified scene text in one or more non-character tokens to obtain a formatted scene text.

15. The apparatus of claim 13, further comprising:

an optical character recognition (OCR) component configured to extract text from training images.

16. The apparatus of claim 13, further comprising:

a super-resolution network configured to enhance a resolution of a base image.

17. The apparatus of claim 13, wherein:

the image generation network comprises a diffusion model.

* * * * *